US 10,489,099 B2

(12) United States Patent
Ma et al.

(10) Patent No.: US 10,489,099 B2
(45) Date of Patent: Nov. 26, 2019

(54) SPLICED PANEL AND METHOD AND DEVICE FOR AUTOMATICALLY ALLOCATING CONTENT TO BE DISPLAY ON SPLICED PANEL

(71) Applicant: BOE TECHNOLOGY GROUP CO., LTD., Beijing (CN)

(72) Inventors: Xitong Ma, Beijing (CN); Tianyue Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 191 days.

(21) Appl. No.: 15/520,347

(22) PCT Filed: Jun. 8, 2016

(86) PCT No.: PCT/CN2016/085252
§ 371 (c)(1),
(2) Date: Apr. 19, 2017

(87) PCT Pub. No.: WO2017/148038
PCT Pub. Date: Sep. 8, 2017

(65) Prior Publication Data
US 2018/0088888 A1 Mar. 29, 2018

(30) Foreign Application Priority Data

Mar. 4, 2016 (CN) .......................... 2016 1 0125357

(51) Int. Cl.
G06F 3/14 (2006.01)
G06T 1/00 (2006.01)
(Continued)

(52) U.S. Cl.
CPC .............. G06F 3/1446 (2013.01); G06F 3/14 (2013.01); G06F 3/147 (2013.01); G06T 1/0007 (2013.01);
(Continued)

(58) Field of Classification Search
CPC .......... G06F 3/1446; G06F 3/147; G06F 3/14; G06F 3/1423; G06T 3/4038;
(Continued)

(56) References Cited

U.S. PATENT DOCUMENTS 6,222,593 B1 * 4/2001 Higurashi .............. G03B 37/04
315/368.12
2007/0065010 A1 * 3/2007 Shie ........................ G09G 3/001
382/173
(Continued)

FOREIGN PATENT DOCUMENTS

CN 101404151 A 4/2009
CN 101526890 A 9/2009
(Continued)

OTHER PUBLICATIONS

International Search Report dated Nov. 30, 2016 issued in corresponding International Application No. PCT/CN2016/085252.
(Continued)

Primary Examiner — Darlene M Ritchie
(74) Attorney, Agent, or Firm — Nath, Goldberg & Meyer; Joshua B. Goldberg; Stanley N. Protigal

(57) ABSTRACT

The present disclosure provides a spliced panel, a method for automatically allocating content to be displayed on the spliced panel, and a device for automatically allocating content to be displayed on the spliced panel. The method for automatically allocating content to be displayed on a spliced panel includes steps of S1: acquiring an image of the spliced panel; S2: analyzing the acquired image to obtain an arrangement manner of a plurality of display panels included in the spliced panel; S3: dividing an image to be displayed on the spliced panel into a plurality of sub-images according to the resultant arrangement manner of the plurality of display panels, such that the plurality of sub-images have a one-to-one correspondence to the plurality of display panels;
(Continued)

and S4: inputting each of the plurality of sub-images to the corresponding display panel.

3 Claims, 4 Drawing Sheets

(51) Int. Cl.
    *G06G 5/00*            (2006.01)
    *G06F 3/147*         (2006.01)
    *G06T 3/40*            (2006.01)
    *G09G 5/14*            (2006.01)
    *G09G 5/00*            (2006.01)

(52) U.S. Cl.
    CPC .......... *G06T 3/4038* (2013.01); *G06T 3/4092* (2013.01); *G09G 5/00* (2013.01); *G09G 5/005* (2013.01); *G09G 5/14* (2013.01); *G09G 2300/026* (2013.01); *G09G 2340/0407* (2013.01); *G09G 2340/0464* (2013.01); *G09G 2340/14* (2013.01); *G09G 2350/00* (2013.01)

(58) Field of Classification Search
    CPC ....... G06T 3/4092; G06T 1/0007; G09G 5/00; G09G 5/005; G09G 5/14; G09G 2350/00; G09G 2340/0407; G09G 2340/14; G09G 2340/0464; G09G 2300/026; G09G 3/006; G09G 2320/0233; G09G 2320/0693
    See application file for complete search history.

(56) References Cited

U.S. PATENT DOCUMENTS

| | | | |
|---|---|---|---|
| 2010/0033402 A1* | 2/2010 | Yoshida | G06F 3/1446 345/1.3 |
| 2011/0047489 A1* | 2/2011 | Orr | G06F 3/0482 715/764 |
| 2012/0242893 A1* | 9/2012 | Akitomo | G06F 3/1446 348/441 |
| 2012/0268350 A1* | 10/2012 | Yoshimura | G09G 3/3426 345/1.3 |
| 2013/0222722 A1* | 8/2013 | Zhao | G09G 5/36 349/33 |
| 2014/0035795 A1* | 2/2014 | Park | G06F 3/1431 345/1.3 |
| 2014/0240201 A1* | 8/2014 | Takahashi | G06F 3/1446 345/1.3 |
| 2015/0279037 A1* | 10/2015 | Griffin | G06F 3/1446 345/1.3 |
| 2015/0293740 A1* | 10/2015 | Cho | H04N 21/4122 345/1.2 |
| 2015/0309764 A1* | 10/2015 | Yamakita | G06F 3/1431 345/1.3 |
| 2015/0348250 A1* | 12/2015 | Nakai | G09G 3/20 345/635 |
| 2016/0103649 A1* | 4/2016 | Yoshitani | G06F 3/1446 345/694 |
| 2016/0133224 A1* | 5/2016 | Nakajima | G06F 3/1446 348/445 |
| 2016/0139867 A1* | 5/2016 | Cha | G06F 3/1423 348/383 |
| 2016/0162240 A1* | 6/2016 | Gu | H04N 21/4402 345/1.3 |
| 2016/0231975 A1* | 8/2016 | Kim | G06F 3/1446 |
| 2016/0335039 A1* | 11/2016 | Cho | G06F 3/1446 |
| 2016/0358582 A1* | 12/2016 | Lee | G09G 5/10 |
| 2017/0075638 A1* | 3/2017 | Poornachandran | G06F 3/1423 |
| 2017/0115946 A1* | 4/2017 | Kim | G06F 3/1446 |
| 2017/0192733 A1* | 7/2017 | Huang | G06F 3/1446 |
| 2017/0286045 A1 | 10/2017 | Ma et al. | |
| 2018/0144716 A1* | 5/2018 | Jung | G09G 3/3208 |
| 2018/0217800 A1* | 8/2018 | Yoshizumi | G06F 3/1446 |
| 2018/0277055 A1* | 9/2018 | Sakai | G09G 5/02 |

FOREIGN PATENT DOCUMENTS

| | | |
|---|---|---|
| CN | 103021377 A | 4/2013 |
| CN | 103220478 A | 7/2013 |
| CN | 105243966 A | 1/2016 |
| JP | 2011-141424 A | 7/2011 |

OTHER PUBLICATIONS

Chinese office action dated Sep. 5, 2017 for corresponding CN application 201610125357.1 with English translation attached.

* cited by examiner

SPLICED PANEL AND METHOD AND DEVICE FOR AUTOMATICALLY ALLOCATING CONTENT TO BE DISPLAY ON SPLICED PANEL

This is a National Phase Application filed under 35 U.S.C. 371 as a national stage of PCT/CN2016/085252, filed Jun. 8, 2016, an application claiming the benefit of Chinese Application No. 201610125357.1, filed Mar. 4, 2016, the content of each of which is hereby incorporated by reference in its entirety.

FIELD OF THE INVENTION

The present invention relates to the field of display technology, and in particular, relates to a spliced panel, a method for automatically allocating content to be displayed on the spliced panel, and a device for automatically allocating content to be displayed on the spliced panel.

BACKGROUND OF THE INVENTION

A plurality of panels are spliced together to form a spliced panel with a sufficiently large size, thereby meeting the requirement for large size in applications such as outdoor display.

In an existing display method of an existing spliced panel, an operator is required to detect a splicing manner in which the plurality of panels are spliced. After the splicing manner is determined, the content of an entire image to be displayed on the spliced panel is divided into a plurality of portions manually, and then the plurality of portions are allocated to the plurality of panels, respectively. Each of the plurality of panels displays the portion of content allocated thereto, so that the spliced panel displays the entire image. The defect existing in this display method is that, for each of various spliced panels of various splicing manners, it is necessary for an operator to determine a dividing manner of the to-be-displayed content before allocating image information to the panels of the spliced panel. Thus, this display method is complicated and inefficient, and has a poor universality.

SUMMARY OF THE INVENTION

To solve at least one of the technical problems existing in the prior art, the present invention provides a spliced panel, a method for automatically allocating content to be displayed on the spliced panel, and a device for automatically allocating content to be displayed on the spliced panel, which ensure automatically allocating the content required for displaying to each of display panels of the spliced panel in any case where the display panels are spliced together, so that there is no need to determine a splicing manner of the display panels manually. As a result, display operations are simplified, and display can be performed automatically and universally.

Embodiments of the present invention provide a method for automatically allocating content to be displayed on a spliced panel. The method includes steps of S1: acquiring an image of the spliced panel; S2: analyzing the acquired image to obtain an arrangement manner of a plurality of display panels included in the spliced panel; S3: dividing an image to be displayed on the spliced panel into a plurality of sub-images according to the resultant arrangement manner of the plurality of display panels, such that the plurality of sub-images have a one-to-one correspondence to the plurality of display panels; and S4: inputting each of the plurality of sub-images to the corresponding display panel.

The method for automatically allocating content to be displayed on a spliced panel may further include, after the step S3 and before the step S4, a step of adjusting a resolution of each of the plurality of sub-images resulted from the division, such that the resolution of each of the plurality of sub-images is the same as that of the corresponding display panel, wherein, in the step S4, inputting each resolution-adjusted sub-image to the corresponding display panel.

In the method, in the step S2, the arrangement manner of the plurality of display panels is obtained by using a field programmable gate array.

In the method, in the step S1, the image of the spliced panel is acquired by using a CCD camera.

Embodiments of the present invention further provide a device for automatically allocating content to be displayed on a spliced panel. The device includes an image acquisition unit configured to acquire an image of the spliced panel; an image analyzer configured to analyze the image acquired by the image acquisition unit to obtain an arrangement manner of a plurality of display panels included in the spliced panel; a divider configured to divide an image to be displayed on the spliced panel into a plurality of sub-images according to the arrangement manner of the plurality of display panels, such that the plurality of sub-images have a one-to-one correspondence to the plurality of display panels; and an input device configured to input each of the plurality of sub-images to the corresponding display panel.

The device for automatically allocating content to be displayed on a spliced panel may further include a resolution adjuster configured to adjust resolution of each of the plurality of sub-images resulted from the division, such that the resolution of each of the plurality of sub-images is the same as that of the corresponding display panel.

In the device for automatically allocating content to be displayed on a spliced panel, the image analyzer includes a field programmable gate array.

In the device for automatically allocating content to be displayed on a spliced panel, the image acquisition unit includes a CCD camera.

In the device for automatically allocating content to be displayed on a spliced panel, the image acquisition unit further includes an extensible and retractable support, the CCD camera is provided on the extensible and retractable support, and the extensible and retractable support is configured to extend the CCD camera out when there is a need to acquire an image, and to retract the CCD camera back when there is no need to acquire an image.

Embodiments of the present invention further provide a spliced panel, which includes a plurality of display panels spliced together and the device for automatically allocating content to be displayed on the spliced panel provided by the present invention.

The present invention has the following advantages.

In the method and device for automatically allocating content to be displayed on a spliced panel provided by the present invention, an image of the spliced panel is acquired, an arrangement manner of a plurality of display panels included in the spliced panel is analyzed according to the acquired image, an image to be displayed on the spliced panel is divided into a plurality of sub-images according to the resultant arrangement manner of the plurality of display panels, and the plurality of sub-images are inputted to the respective display panels to display. Compared with the prior art, the method and device provided by the present invention can automatically allocate the content required for displaying to each display panel regardless of the splicing manner of the plurality of display panels, so that there is no need to determine a splicing manner of the display panels manually. As a result, display operations are simplified, and display can be performed automatically and universally.

The spliced panel provided by the present invention includes the device for automatically allocating content to be displayed on the spliced panel provided by the present invention, and can automatically allocate the content required for displaying to each display panel regardless of the splicing manner of the plurality of display panels. Thus, compared with the prior art, there is no need to determine a splicing manner of the display panels manually in the present invention. As a result, display operations are simplified, and display can be performed automatically and universally.

BRIEF DESCRIPTION OF THE DRAWINGS

The accompanying drawings are provided for better understanding of the present invention, and constitute a part of the present disclosure. Further, the accompanying drawings are for the purpose of explaining the present invention together with the following embodiments, but are not intended to limit the present invention.

DESCRIPTION OF REFERENCE NUMERALS

10—image acquisition unit, 11—image analyzer, 12—divider, 13—input device, 14—resolution adjuster.

DETAILED DESCRIPTION OF THE EMBODIMENTS

Embodiments of the present invention will be described in further detail below with reference to the accompanying drawings. It should be noted that, the embodiments provided herein are only for the purpose of describing and explaining the present, but are not intended to limit the present invention.

Figure 1:
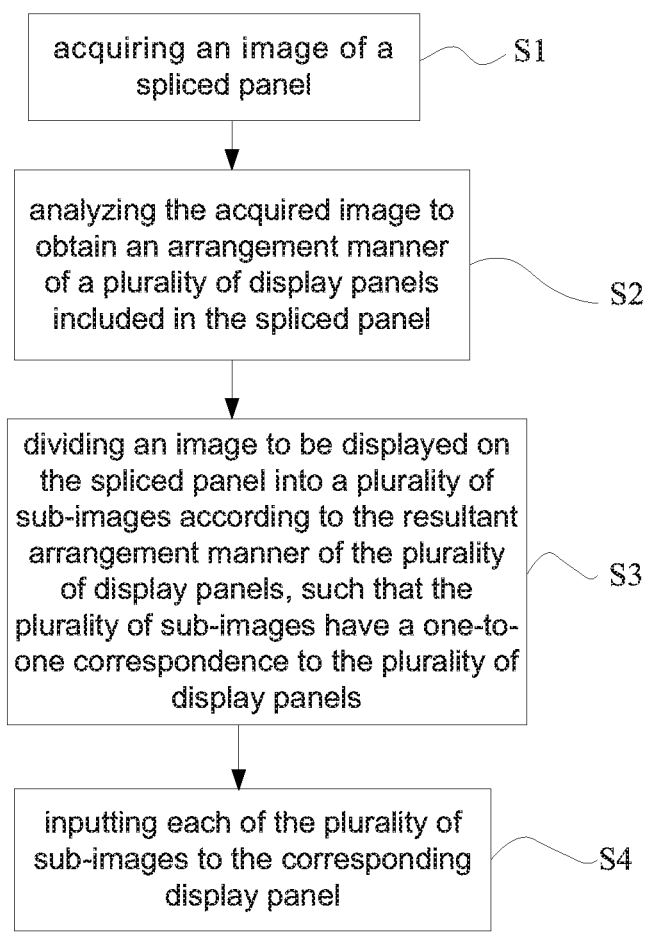
FIG. 1 is a flowchart showing a method for automatically allocating content to be displayed on a spliced panel according to a first embodiment of the present invention.

Some embodiments of the present invention provide a method for automatically allocating content to be displayed on a spliced panel. In a first embodiment, the method for automatically allocating content to be displayed on a spliced panel includes the following steps S1 to S4, as shown in FIG. 1.

The step S1 includes acquiring an image of the spliced panel.

In the step S1, in particular, the image of the spliced panel may be acquired by using a CCD camera. Alternatively, the image of the spliced panel may be acquired by using other optical cameras or other types of image acquisition device. No matter what kind of image acquisition device is employed, as long as the acquired image shows the plurality of display panels included in the spliced panel.

The step S2 includes analyzing the acquired image to obtain an arrangement manner of the plurality of display panels included in the spliced panel.

Figure 2:
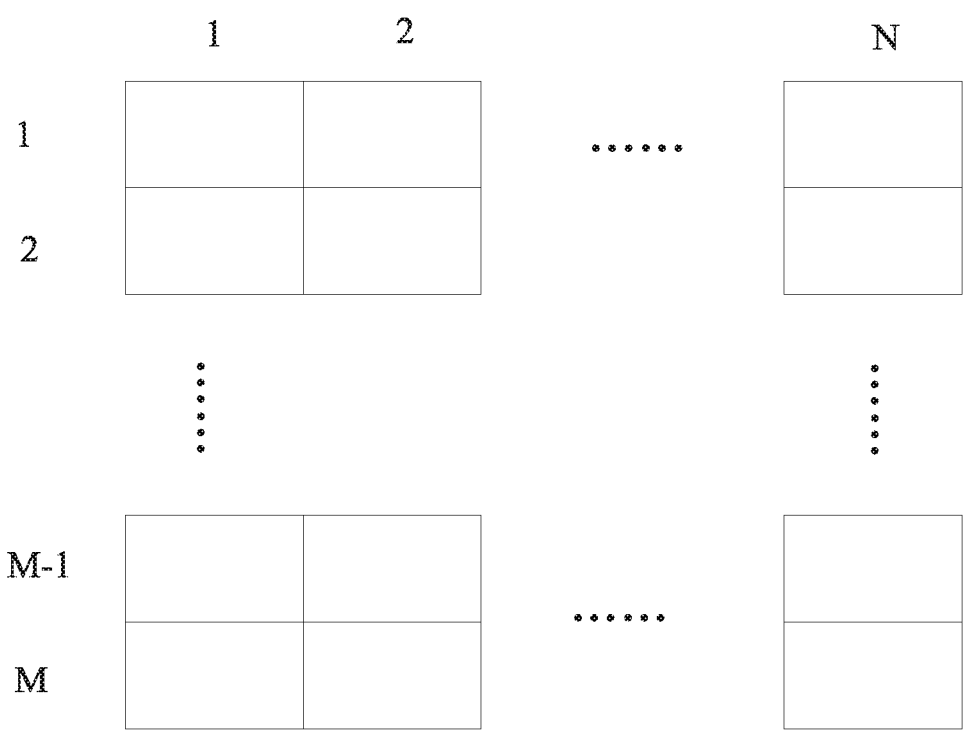
FIG. 2 is a schematic diagram showing display panels of the spliced panel which are arrayed in M rows and N columns.

In the step S2, boundaries of the plurality of display panels are recognized in the acquired image, so as to determine the relative positional relationship between the plurality of display panels, thereby determining a splicing manner of the plurality of display panels included in the spliced panel. For example, as shown in FIG. 2, an arrangement manner of the plurality of display panels included in the spliced panel is in that the plurality of display panels are arranged by M rows in the horizontal direction and N columns in the vertical direction.

In particular, the acquired image may be analyzed by a field programmable gate array (FPGA) to recognize boundaries of the plurality of display panels, so as to obtain the arrangement manner (i.e., the splicing manner) of the plurality of display panels.

It should be noted that, the above steps S1 and S2 are performed after the plurality of display panels included in the spliced panel are arranged completely and before the spliced panel starts to display, but are not performed during the display by the spliced panel. Alternatively, the steps S1 and S2 may be performed immediately after a boot-up of the spliced panel, after the steps S1 and S2 are performed, the splicing manner of the spliced panel is obtained and stored. Thus, it is not required to perform the steps S1 and S2 again when display starts.

The step S3 includes dividing an image to be displayed on the spliced panel into a plurality of sub-images according to the resultant arrangement manner of the plurality of display panels, such that the plurality of sub-images have a one-to-one correspondence to the plurality of display panels. It should be noted that, a splicing manner (i.e., an arrangement manner) for splicing the plurality of sub-images together to form the image to be display on the spliced panel may be the same as the splicing manner (i.e., the arrangement manner) for splicing the plurality of panels together to form the spliced panel.

In the step S2, after the splicing manner of the plurality of panels is determined, the spliced panel may start to display an image. Taking the arrangement manner of the plurality of display panels included in the spliced panel as shown in FIG. 2 as an example, when an image is to be displayed, the image to be displayed on the spliced panel is divided into M×N sub-images, such that these sub-images have a one-to-one correspondence to the display panels arrayed in M rows and N columns, and the content of each sub-image corresponds to the content to be displayed on the corresponding display panel.

The step S4 includes inputting each of the plurality of sub-images to the corresponding display panel.

In the step S4, each of the plurality of sub-images is transmitted to the corresponding display panel by signal transmission. When each of the plurality of display panels displays the content of the corresponding sub-image, the spliced panel as a whole displays an entire image required for displaying.

Figure 3:
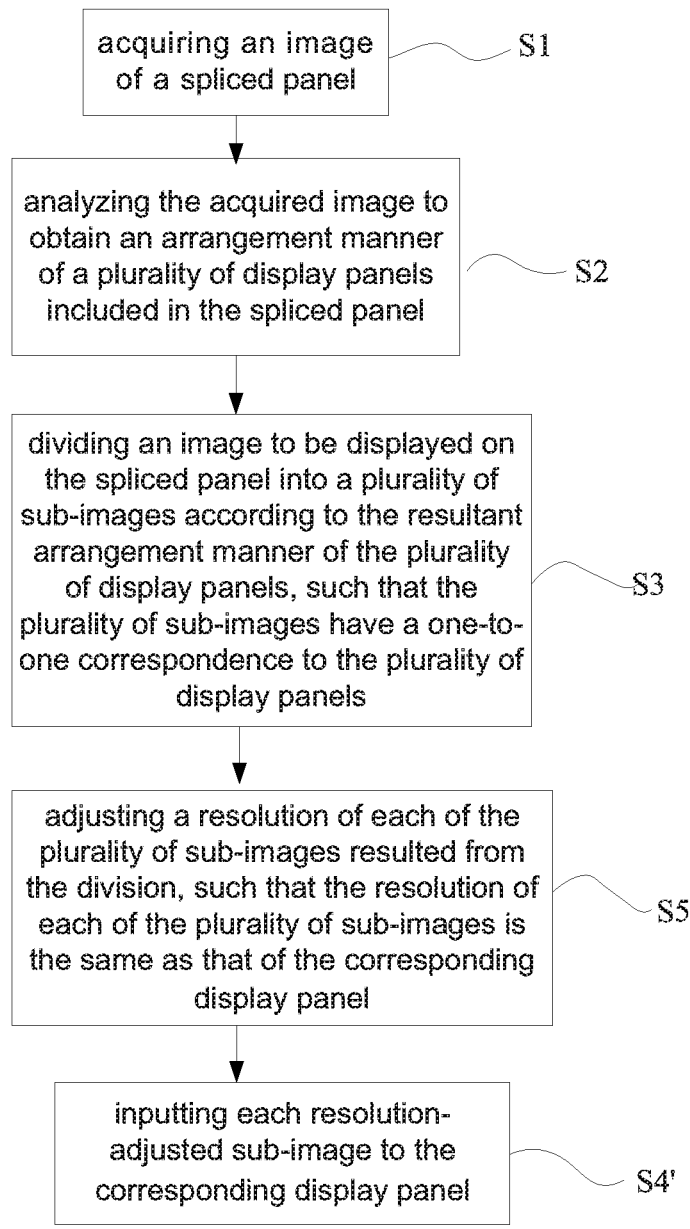
FIG. 3 is a flowchart showing a method for automatically allocating content to be displayed on the spliced panel according to a second embodiment of the present invention.

A method for automatically allocating content to be displayed on a spliced panel according to a second embodiment of the present invention will be described below. Compared with the first embodiment, in addition to the steps S1, S2, and S3 as described above, the method for automatically allocating content to be displayed on a spliced panel according to the second embodiment further includes a step S5 of adjusting a resolution of each of the plurality of sub-images resulted from the division, such that the resolution of each of the plurality of sub-images is the same as that of the corresponding display panel, and the step S5 is performed after the step S3 and before a step S4', as shown in FIG. 3. Further, in the step S4', each resolution-adjusted sub-image is inputted to the corresponding display panel. For example, when the spliced panel as shown in FIG. 2 is to display an image having a resolution of 1920×1080, it is presumed that a sub-image allocated to each display panel has a resolution of (1920/N)×(1080/M), and each display panel has a resolution of 1920×1080. In this case, it is easily appreciated that each display panel has a physical resolution greater than the resolution of the sub-image to be displayed. According to the present embodiment, the resolution of each sub-image is adjusted. In this example, the resolution of each sub-image is adjusted from (1920/N)×(1080/M) to 1920×1080, such that each display panel displays a sub-image having a resolution which is the same as the physical resolution of the display panel. In this way, each display panel and the whole spliced panel have a better display effect.

To sum up, in the method for automatically allocating content to be displayed on a spliced panel provided by the first and second embodiments of the present invention, an image of the spliced panel is acquired, an arrangement manner of a plurality of display panels included in the spliced panel is analyzed according to the acquired image, an image to be displayed on the spliced panel is divided into a plurality of sub-images according to the resultant arrangement manner, and the plurality of sub-images are inputted to the respective display panels to display. Compared with the prior art, there is no need to determine a splicing manner of the display panels manually herein. As a result, display operations are simplified, and display can be performed automatically and universally.

Figure 4:
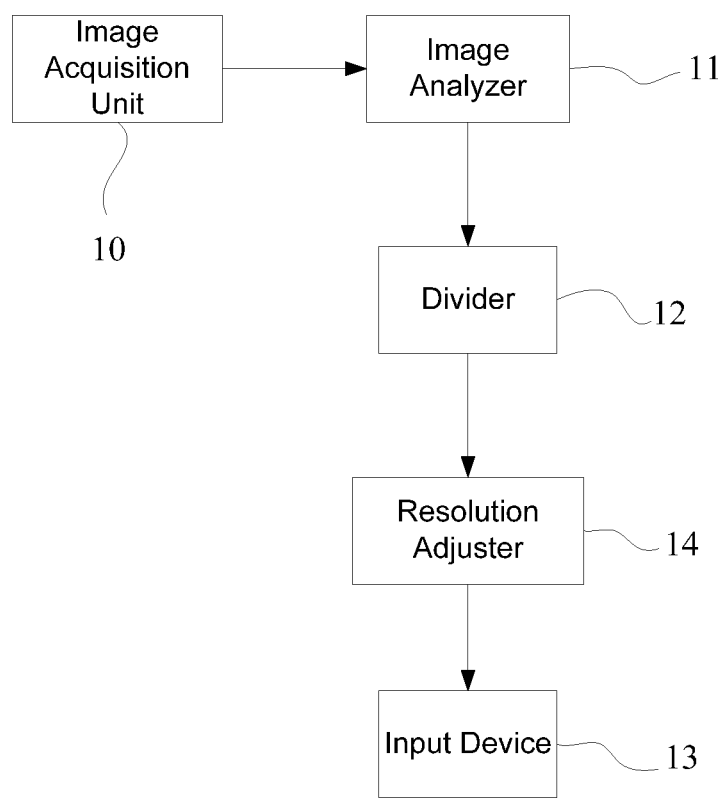
FIG. 4 is a schematic diagram showing a device for automatically allocating content to be displayed on the spliced panel according to embodiments of the present invention.

Another embodiment of the present invention provides a device for automatically allocating content to be displayed on a spliced panel. As shown in FIG. 4, in the present embodiment, the device for automatically allocating content to be displayed on a spliced panel includes an image acquisition unit 10, an image analyzer 11, a divider 12, and an input device 13. The image acquisition unit 10 is configured to acquire an image of the spliced panel. The image analyzer 11 is configured to analyze an arrangement manner (i.e., a splicing manner) of a plurality of display panels included in the spliced panel according to the image acquired by the image acquisition unit 10. The divider 12 is configured to divide an image to be displayed on the spliced panel into a plurality of sub-images according to the arrangement manner of the plurality of display panels, such that the plurality of sub-images have a one-to-one correspondence to the plurality of display panels. The input device 13 is configured to input each of the plurality of sub-images to the corresponding display panel.

In the present embodiment, the image acquisition unit 10 may include a CCD camera and an extensible and retractable support. The CCD camera is provided on the extensible and retractable support. The extensible and retractable support is configured to extend the CCD camera out when there is a need to acquire an image, and to retract the CCD camera back when there is no need to acquire an image. Thus, the CCD camera can be prevented from being damaged when there is no need to acquire an image. It should be noted that in the present embodiment, the CCD camera may be replaced with any image acquisition device of other types.

The image analyzer 11 may be a field programmable gate array (FPGA). A boundary in an image can be easily recognized by the FPGA, thus the splicing manner of the plurality of display panels can be analyzed by recognizing boundaries of the plurality of display panels in the image of the spliced panel.

In the present embodiment, an image of the spliced panel is acquired by the image acquisition unit 10, and the acquired image is analyzed by the image analyzer 11 to obtain a splicing manner of a plurality of display panels included in the spliced panel. The divider 12 divides an image to be displayed on the spliced panel into a plurality of sub-images according to the result (i.e., the resultant splicing manner) obtained by the image analyzer 11, and the input device 13 inputs each of the plurality of sub-images to the corresponding display panel for displaying. In this way, the spliced panel can display an entire image. Compared with the prior art, in the device for automatically allocating content to be displayed on a spliced panel provided by the present embodiment, there is no need to determine a splicing manner of the display panels manually. As a result, display operations are simplified, and display can be performed automatically and universally.

Optionally, the device for automatically allocating content to be displayed on a spliced panel may further include a resolution adjuster 14. The resolution adjuster 14 is configured to adjust a resolution of each of the plurality of sub-images resulted from the division, such that the resolution of each of the plurality of sub-images is the same as that of the corresponding display panel. In this way, it is ensured that the corresponding display panel and the spliced panel have better display effect. It should be noted that, the resolution adjuster 14 is not an indispensable component of the device for automatically allocating content to be displayed on a spliced panel.

Another embodiment of the present invention provides a spliced panel, which includes a plurality of display panels spliced together and the device for automatically allocating content to be displayed on the spliced panel provided by the present invention.

In the present embodiment, the content required for displaying can be automatically allocated to each display panel regardless of the splicing manner of the plurality of display panels. Thus, compared with the prior art, there is no need to determine a splicing manner of the display panels manually with the spliced panel provided by the present embodiment. As a result, display operations are simplified, and displaying can be performed automatically and universally.

It should be understood that, the above embodiments are only exemplary embodiments for the purpose of explaining the principle of the present invention, but the present invention is not limited thereto. For a person having ordinary skill in the art, various improvements and modifications may be made without departing from the spirit and essence of the present invention. These improvements and modifications also fall within the protection scope of the present invention.

What is claimed is:

1. A method for automatically allocating content to be displayed on a spliced panel, comprising steps of
    S1: acquiring a photograph-type image of the spliced panel before the spliced panel starts to display;
    S2: analyzing the acquired photograph-type image to recognize boundaries the plurality of display panels, so as to obtain an arrangement manner of a plurality of display panels included in the spliced panel before the spliced panel starts to display;

S3: dividing an image to be displayed on the spliced panel into a plurality of sub-images according to the resultant arrangement manner of the plurality of display panels, such that the plurality of sub-images have a one-to-one correspondence to the plurality of display panels; and S4: inputting each of the plurality of sub-images to the corresponding display panel;

wherein the method further comprises, after the step S3 and before the step S4, a step of adjusting a resolution of each of the plurality of sub-images resulted from the step S3, such that the resolution of each of the plurality of sub-images is the same as that of the corresponding display panel, and wherein in the step S4, each resolution-adjusted sub-image is input to the corresponding display panel.

2. The method according to claim 1, wherein, in the step S2, the arrangement manner of the plurality of display panels is obtained by using a field programmable gate array.

3. The method according to claim 1, wherein, in the step S1, the photograph-type image of the spliced panel is acquired by using a CCD camera.

* * * * *